United States Patent
Udagawa et al.

(10) Patent No.: US 7,712,565 B2
(45) Date of Patent: May 11, 2010

(54) HST TRAVEL SYSTEM FOR WORKING MACHINE

(75) Inventors: Tsutomu Udagawa, Tsukuba (JP); Eiji Egawa, Tsuchiura (JP); Akira Nakayama, Tsuchiura (JP); Kazuo Takiguchi, Moriya (JP); Tsukasa Toyooka, Ibaraki-ken (JP); Makoto Sugaya, Narita (JP); Kensuke Sato, Ushiku (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 553 days.

(21) Appl. No.: 11/632,776

(22) PCT Filed: Mar. 6, 2006

(86) PCT No.: PCT/JP2006/304265

§ 371 (c)(1),
(2), (4) Date: Jan. 18, 2007

(87) PCT Pub. No.: WO2006/098179

PCT Pub. Date: Sep. 21, 2006

(65) Prior Publication Data

US 2007/0235241 A1  Oct. 11, 2007

(30) Foreign Application Priority Data

Mar. 15, 2005  (JP) .............................. 2005-072891

(51) Int. Cl.
*B60K 17/356* (2006.01)

(52) U.S. Cl. .................. 180/242; 180/308; 180/248; 180/305

(58) Field of Classification Search .................. 180/242, 180/308, 248, 305, 307, 245, 246, 247, 249
See application file for complete search history.

(56) References Cited

U.S. PATENT DOCUMENTS

| | | | | | |
|---|---|---|---|---|---|
| 5,848,664 | A | * | 12/1998 | Kaspar | 180/308 |
| 6,305,486 | B1 | * | 10/2001 | Polzin et al. | 180/308 |
| 6,904,993 | B1 | * | 6/2005 | Rinck et al. | 180/244 |
| 2001/0025736 | A1 | | 10/2001 | Ikari et al. | |
| 2006/0272878 | A1 | * | 12/2006 | Ohashi et al. | 180/305 |

(Continued)

FOREIGN PATENT DOCUMENTS

DE  59301564  3/1996

(Continued)

*Primary Examiner*—Lesley Morris
*Assistant Examiner*—Tashiana Adams
(74) *Attorney, Agent, or Firm*—Mattingly & Malur, P.C.

(57) ABSTRACT

A hydro-static transmission travel system for a working machine enables the working machine to travel over a range from low speed to high speed with a simplified circuit arrangement. By referring to a machine traveling speed (vehicle speed) based on a detected signal from a rotation sensor, a controller computes respective target tilting amounts of hydraulic motors 10, 20 and controls the tilting amount for the hydraulic motors and a clutch. Depending on whether the traveling speed exceeds a setting speed as a reference boundary, the controller selectively switches over a drive mode between low-speed four-wheel drive, in which travel units 12, 22 are both driven, and high-speed two-wheel drive, in which the front-wheel side hydraulic motor 10 is controlled to zero displacement and only the rear-wheel side travel unit 22 is driven.

5 Claims, 9 Drawing Sheets

U.S. PATENT DOCUMENTS

2008/0296080 A1* 12/2008 Ishii et al. .................. 180/308

FOREIGN PATENT DOCUMENTS

| EP | 0653324 | 5/1995 |
|---|---|---|
| JP | 59-23467 | 2/1984 |
| JP | 61-018524 | 1/1986 |
| JP | 05-306768 | 11/1993 |
| JP | 11-166623 | 6/1999 |
| JP | 11-230333 | 8/1999 |
| JP | 2000-001127 | 1/2001 |
| JP | 2004-338460 | 2/2004 |
| WO | WO 91/01899 | 2/1991 |
| WO | WO95/11815 | 5/1995 |

* cited by examiner

HST TRAVEL SYSTEM FOR WORKING MACHINE

TECHNICAL FIELD

The present invention relates to an HST travel system for a working machine, and more particularly to an HST travel system for a working machine, such as a rough-terrain lift truck, a wheel loader, or a wheel-type hydraulic excavator, equipped with a hydraulic travel circuit called HST (Hydro-Static Transmission) in which a hydraulic pump and a travel motor are connected to each other in a closed circuit.

BACKGROUND ART

In known HST travel systems, as disclosed in, e.g., JP,A 5-306768, it is general that one hydraulic pump and one hydraulic motor are connected to each other in a closed circuit and a travel unit is driven by the one hydraulic motor. In that case, the hydraulic motor is connected to front and rear wheels through a transmission and a propeller shaft such that the front and rear wheels are driven at the same time with rotation of the propeller shaft.

In another type of HST travel system, as disclosed in, e.g., JP,A 11-166623 and JP,A 11-230333, one hydraulic pump is connected in parallel to two hydraulic motors in a closed circuit and a travel unit is driven by the two hydraulic motors. In that case, the two hydraulic motors are connected to front and rear wheels through a reduction gearing and a propeller shaft such that the front and rear wheels are driven at the same time with rotation of the propeller shaft. Further, one hydraulic motor is connected to the reduction gearing through a clutch, thus enabling a low speed (high torque) mode (clutch-ON) and a high speed mode (clutch-OFF) to be switched over with ON/OFF control of the clutch. Accordingly, a transmission is not required.

Moreover, still another type of HST travel system is known in which one hydraulic pump is connected in parallel to two hydraulic motors in a closed circuit and the two hydraulic motors are connected respectively to front and rear wheels such that the front and rear wheels are driven by the separate hydraulic motors. For example, JP,A 2000-1127 discloses an HST travel system for a lawn mower which is operated in four-wheel drive with the front and rear wheels both held in a high torque state at low speed, and which is operated in a four-wheel drive mode with the front wheels held in a low torque state and the rear wheels held in a high torque state at high speed, thereby enabling a driving force to be hydraulically transmitted to the front wheels as well during travel. Further, when the lawn mower turns, it is operated in two-wheel drive with only the rear wheels driven, to thereby prevent drag of the front wheels during the turn. To change driving torque of the front-wheel hydraulic motor, a constant-ratio distribution valve is disposed at a supply/drain hydraulic port of the hydraulic pump, and a shuttle valve is disposed between main lines on the side including the front-wheel hydraulic motor. Further, a high-pressure relief valve and a low-pressure relief valve are connected in parallel on the output side of the shuttle valve.

GB2136371A discloses an HST travel system for an agricultural machine. More specifically, one of two hydraulic motors is constituted as an auxiliary motor with small displacement, the auxiliary motor is connected to front or rear wheels through a clutch and a reduction gearing, and an open/close valve is disposed between a hydraulic pump and the auxiliary motor. Connection and disconnection between the auxiliary motor and the hydraulic pump or between the auxiliary motor and the wheels are performed by switching over the clutch and the open/close valve at the same time.

Patent Document 1: JP,A 5-306768
Patent Document 2: JP,A 11-166623
Patent Document 3: JP,A 11-230333
Patent Document 4: JP,A 2000-1127
Patent Document 5: GB2136371A

DISCLOSURE OF THE INVENTION

Problems to be Solved by the Invention

However, the above-mentioned prior art has the following problems.

In the general HST travel system disclosed in JP,A 5-306768, because the hydraulic motor is connected to the front and rear wheels through the transmission and the propeller shaft such that the front and rear wheels are driven at the same time with the rotation of the propeller shaft, the transmission and the propeller shaft are essential as the travel unit. The transmission and the propeller shaft are positioned under a cab, and the propeller shaft is longitudinally extended under the engine and the cab for connection to the front and rear wheels. Therefore, the cab and the engine are required to be installed at a position and a height out of interference with the transmission and the propeller shaft. As a result, the vehicle height (cab height) is increased and viewability from the cab toward an operating mechanism is deteriorated correspondingly, thus resulting in reduction of working efficiency. Another problem is that the provision of the transmission and the propeller shaft restricts the degree of freedom in layout of the engine, the cab, and other units of equipment.

In the HST travel systems each using two hydraulic motors, which are disclosed in JP,A 11-166623 and JP,A 11-230333, the transmission is not required, but the propeller shaft is required. Therefore, the problem of restriction on the vehicle height and layout due to the provision of the propeller shaft is not solved.

In the HST travel systems disclosed in JP,A 2000-1127 and GB2136371A, because the front and rear wheels are driven by the separate hydraulic motors, the propeller shaft is not required and therefore the problem of restriction on the vehicle height and layout due to the provision of the propeller shaft does not occur. Further, in the system of JP,A 2000-1127, the drive mode can be switched over to the four-wheel drive during the straightforward travel and to the two-wheel drive during the turn. In the system of GB2136371A, the drive mode can be switched over to the four-wheel drive during the low-speed travel and to the two-wheel drive during the high-speed travel. In any of those systems, however, the open/close valve is disposed between the main lines and is operated to open or close for switching over the drive mode, thus resulting in the complicated circuit arrangement.

Moreover, when the hydraulic circuit on the side including one hydraulic motor is cut off or opened with shifting of the open/close valve (i.e., with the switching-over between the two-wheel drive and the four-wheel drive), there occurs an abrupt change in the flow rate of a hydraulic fluid (i.e., an excessive flow rate with the switching-over from the four-wheel drive to the two-wheel drive). Accordingly, a variation in circuit pressure, e.g., a surge pressure, is generated and driving torque of the hydraulic motor is fluctuated, thus causing a shock. Also, when the drive mode is switched over from the two-wheel drive to the four-wheel drive, the open/close valve is shifted from the closed state to the open state and the clutch is switched over from the OFF-state to the ON-state. At that time, a wheel rotating force is abruptly transmitted to the hydraulic motor held in the stopped state, and driving torque (drag torque) is generated due to an inertial force of the hydraulic motor, thus causing a shock.

In addition, because the switching-over between the two-wheel drive (high-speed drive) and the four-wheel drive (low-speed drive) is performed by manually shifting the open/close valve, a problem also arises in the point of operability.

A first object of the present invention is to provide an HST travel system for a working machine, which requires neither a transmission nor a propeller shaft, and which enables the working machine to travel over a range from low speed to high speed with a simple circuit arrangement.

A second object of the present invention is to provide an HST travel system for a working machine, which requires neither a transmission nor a propeller shaft, which enables the working machine to travel over a range from low speed to high speed with a simple circuit arrangement, and which can reduce a shock generated when four-wheel drive (low-speed drive) and two-wheel drive (high-speed drive) are switched over.

A third object of the present invention is to provide an HST travel system for a working machine, which requires neither a transmission nor a propeller shaft, which enables the working machine to travel over a range from low speed to high speed, and which can automatically switch over four-wheel drive (low-speed drive) and two-wheel drive (high-speed drive) with superior operability.

Means for Solving the Problems (1) To achieve the above first object, the present invention provides an HST travel system for a working machine, the HST travel system comprising a hydraulic pump; first and second hydraulic motors connected to the hydraulic pump in a closed circuit, connected to each other in parallel, and driven by a hydraulic fluid delivered from the hydraulic pump; a first travel unit connected to the first hydraulic motor through a first reduction gearing; a second travel unit connected to the second hydraulic motor through a second reduction gearing; and control means for selectively switching over a drive mode between low-speed four-wheel drive in which the first and second travel units are both driven and high-speed two-wheel drive in which the first hydraulic motor is controlled to zero displacement and only the second travel unit is driven.

According to the present invention thus constituted, since the first travel unit (e.g., the front-wheel side travel unit) and the second travel unit (e.g., the rear-wheel side travel unit) are driven by the separate hydraulic motors, the propeller shaft is no longer required.

Further, since the control means is provided to selectively switch over the drive mode between the low-speed four-wheel drive in which the first and second travel units are both driven and the high-speed two-wheel drive in which only the second travel unit is driven, the working machine can travel over a range from low speed to high speed with the switching-over between the low-speed four-wheel drive and the high-speed two-wheel drive, and the transmission is no longer required. On that occasion, since the switching-over to the high-speed two-wheel drive is performed by controlling the first hydraulic motor to the zero displacement, the open/close valve used in the prior art is no longer required and the circuit arrangement can be simplified.

(2) To achieve the above first and second objects, the present invention also provides an HST travel system for a working machine, the HST travel system comprising a hydraulic pump; first and second hydraulic motors connected to the hydraulic pump in a closed circuit, connected to each other in parallel, and driven by a hydraulic fluid delivered from the hydraulic pump; a first travel unit connected to the first hydraulic motor through a first reduction gearing; a second travel unit connected to the second hydraulic motor through a second reduction gearing; and control means for selectively switching over a drive mode between low-speed four-wheel drive in which the first and second travel units are both driven and high-speed two-wheel drive in which the first hydraulic motor is controlled to zero displacement and only the second travel unit is driven, wherein when the drive mode is switched over from the low-speed four-wheel drive to the high-speed two-wheel drive, the control means controls a displacement of the second hydraulic motor to absorb an excessive flow rate of the hydraulic fluid, which is generated upon the first hydraulic motor being brought to the zero displacement, at the same timing as when the first hydraulic motor is controlled to the zero displacement, and when the drive mode is switched over from the high-speed two-wheel drive to the low-speed four-wheel drive, the control means controls the displacement of the second hydraulic motor to supply the hydraulic fluid at a flow rate required by the first hydraulic motor, which starts to operate with an effective displacement, at the same timing as when the first hydraulic motor is controlled to the effective displacement from the zero displacement.

According to the present invention thus constituted, as with the advantages described in above (1), neither the transmission nor the propeller shaft is required any more, the construction machine can travel over a range from low speed to high speed, and the circuit arrangement can be simplified.

In addition, because of the features that when the drive mode is switched over from the low-speed four-wheel drive to the high-speed two-wheel drive, the control means controls a displacement of the second hydraulic motor to absorb an excessive flow rate of the hydraulic fluid, which is generated upon the first hydraulic motor being brought to the zero displacement, at the same timing as when the first hydraulic motor is controlled to the zero displacement, and that when the drive mode is switched over from the high-speed two-wheel drive to the low-speed four-wheel drive, the control means controls the displacement of the second hydraulic motor to supply the hydraulic fluid at a flow rate required by the first hydraulic motor, which starts to operate with an effective displacement, at the same timing as when the first hydraulic motor is controlled to the effective displacement from the zero displacement, it is possible to suppress an abrupt change in the flow rate of the hydraulic fluid (e.g., generation of the excessive flow rate) caused in a hydraulic circuit with the switching-over between the low-speed four-wheel drive and the high-speed two-wheel drive, to avoid a variation in circuit pressure, e.g., a surge pressure, and to hold down a shock.

(3) To achieve the above first and second objects, the present invention further provides an HST travel system for a working machine, the HST travel system comprising a hydraulic pump; first and second hydraulic motors connected to the hydraulic pump in a closed circuit, connected to each other in parallel, and driven by a hydraulic fluid delivered from the hydraulic pump; a first travel unit connected to the first hydraulic motor through a clutch and a first reduction gearing; a second travel unit connected to the second hydraulic motor through a second reduction gearing; and control means for selectively switching over a drive mode between low-speed four-wheel drive in which the first and second travel units are both driven with the clutch brought into a connected state and high-speed two-wheel drive in which the first hydraulic motor is controlled to zero displacement with the clutch brought into a cutoff state and only the second travel unit is driven, wherein when the drive mode is switched over from the high-speed two-wheel drive to the low-speed four-wheel drive, the control means controls a displacement of the first hydraulic motor for preliminary driving of the first hydraulic motor before the clutch is brought into the connected state, and thereafter the control means controls the clutch to be brought into the connected state.

According to the present invention thus constituted, as with the advantages described in above (1), neither the transmission nor the propeller shaft is required any more, the working machine can travel over a range from low speed to high speed, and the circuit arrangement can be simplified.

In addition, because of the features that when the drive mode is switched over from the high-speed two-wheel drive to the low-speed four-wheel drive, the control means controls a displacement of the first hydraulic motor for preliminary driving of the first hydraulic motor before the clutch is brought into the connected state, and that thereafter the control means controls the clutch to be brought into the connected state, it is possible to reduce the difference between the rotation speed of the first hydraulic motor and the rotation speed of the first travel unit, to reduce an inertial force at startup of the first hydraulic motor, and to hold down the shock caused when the clutch is brought into the connected state.

(4) To achieve the above first and second objects, the present invention still further provides an HST travel system for a working machine, the HST travel system comprising a hydraulic pump; first and second hydraulic motors connected to the hydraulic pump in a closed circuit, connected to each other in parallel, and driven by a hydraulic fluid delivered from the hydraulic pump; a first travel unit connected to the first hydraulic motor through a clutch and a first reduction gearing; a second travel unit connected to the second hydraulic motor through a second reduction gearing; and control means for selectively switching over a drive mode between low-speed four-wheel drive in which the first and second travel units are both driven with the clutch brought into a connected state and high-speed two-wheel drive in which the first hydraulic motor is controlled to zero displacement with the clutch brought into a cutoff state and only the second travel unit is driven, wherein when the drive mode is switched over from the high-speed two-wheel drive to the low-speed four-wheel drive, the control means computes a target rotation speed at which a rotation speed of the first hydraulic motor is matched with a rotation speed of the first travel unit, and controls a displacement of the first hydraulic motor to make the rotation speed of the first hydraulic motor matched with the target rotation speed for preliminary driving of the first hydraulic motor before the clutch is brought into the connected state, and thereafter the control means controls the clutch to be brought into the connected state.

According to the present invention thus constituted, as with the advantages described in above (1), neither the transmission nor the propeller shaft is required any more, and the circuit arrangement can be simplified.

In addition, because of the features that when the drive mode is switched over from the high-speed two-wheel drive to the low-speed four-wheel drive, the control means computes a target rotation speed at which a rotation speed of the first hydraulic motor is matched with a rotation speed of the first travel unit, and controls a displacement of the first hydraulic motor to make the rotation speed of the first hydraulic motor matched with the target rotation speed for preliminary driving of the first hydraulic motor before the clutch is brought into the connected state, and that thereafter the control means controls the clutch to be brought into the connected state, it is possible to make the rotation speed of the first hydraulic motor almost matched with the rotation speed of the first travel unit, and to further hold down the shock caused when the clutch is brought into the connected state.

(5) In above (4), preferably, the control means detects respective pressures at both ports of the first hydraulic motor, and when both the ports of the first hydraulic motor are in pressure condition under which the first hydraulic motor cannot be operated for preliminary driving in a direction to realize the target rotation speed, the control means inhibits the displacement control for the preliminary driving of the first hydraulic motor.

With those features, it is possible to reliably prevent such a situation as causing the reverse rotation of the first hydraulic motor, and to ensure stable traveling.

(6) In above (3) or (4), preferably, when the drive mode is switched over from the low-speed four-wheel drive to the high-speed two-wheel drive, the control means controls a displacement of the second hydraulic motor to absorb an excessive flow rate of the hydraulic fluid, which is generated upon the first hydraulic motor being brought to the zero displacement, at the same timing as when the first hydraulic motor is controlled to the zero displacement, and when the drive mode is switched over from the high-speed two-wheel drive to the low-speed four-wheel drive, the control means controls the displacement of the second hydraulic motor to supply the hydraulic fluid at a flow rate required by the first hydraulic motor, which starts to operate with an effective displacement, at the same timing as when the first hydraulic motor is controlled to the effective displacement from the zero displacement.

With those features, as mentioned in above (2), it is possible to suppress an abrupt change in the flow rate of the hydraulic fluid (e.g., generation of the excessive flow rate) caused in the hydraulic circuit with the switching-over between the low-speed four-wheel drive and the high-speed two-wheel drive, to avoid a variation in circuit pressure, e.g., a surge pressure, and to hold down a shock.

(7) To achieve the above third object, the present invention still further provides an HST travel system for a working machine, the HST travel system comprising a hydraulic pump; first and second hydraulic motors connected to the hydraulic pump in a closed circuit, connected to each other in parallel, and driven by a hydraulic fluid delivered from the hydraulic pump; a first travel unit connected to the first hydraulic motor through a first reduction gearing; a second travel unit connected to the second hydraulic motor through a second reduction gearing; and control means for detecting a machine traveling speed and switching over a drive mode such that when the traveling speed is not higher than a setting value, the drive mode is set to low-speed four-wheel drive in which the first and second travel units are both driven, and when the traveling speed exceeds the setting value, the drive mode is set to high-speed two-wheel drive in which only the second travel unit is driven.

According to the present invention thus constituted, as with the advantages described in above (1), neither the transmission nor the propeller shaft is required any more, and the working machine can travel over a range from low speed to high speed.

In addition, because of the feature including control means for detecting a machine traveling speed and switching over a drive mode such that when the traveling speed is not higher than a setting value, the drive mode is set to low-speed four-wheel drive in which the first and second travel units are both driven, and when the traveling speed exceeds the setting value, the drive mode is set to high-speed two-wheel drive in which only the second travel unit is driven, the drive mode is automatically switched over from the low-speed four-wheel drive to the high-speed two-wheel drive, or vice versa, when the traveling speed reaches the setting value, whereby superior operability can be obtained.

ADVANTAGES OF THE INVENTION

According to the present invention, the transmission and the propeller shaft are no longer required, and the working machine can travel over a range from low speed to high speed while realizing the simplified circuit arrangement.

Also, according to the present invention, the shock generated upon the switching-over between the four-wheel drive (low-speed drive) and the two-wheel drive (high-speed drive) can be suppressed.

Further, according to the present invention, the transmission and the propeller shaft are no longer required, and the working machine can travel over a range from low speed to high speed. In addition, the four-wheel drive (low-speed drive) and the two-wheel drive (high-speed drive) can be automatically switched over with superior operability.

Figure 1:
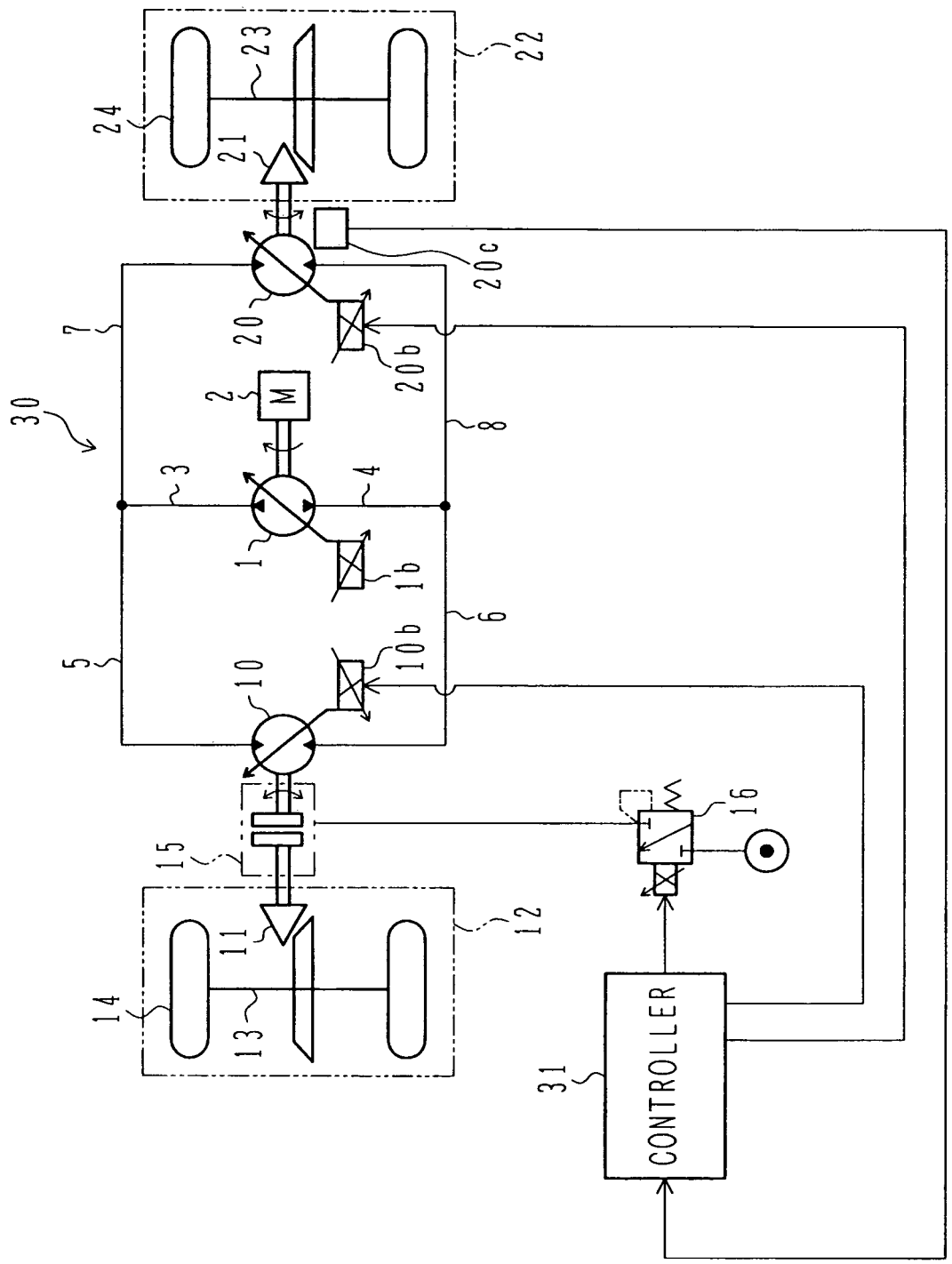
FIG. 1 is a hydraulic construction diagram of an HST travel system according to a first embodiment of the present invention.

REFERENCE NUMERALS 1 hydraulic pump
2 engine
3, 4, 5, 6, 7, 8 main lines
10 (front-wheel side) hydraulic motor
10b tilting amount control means
10c rotation sensor
10d, 10e pressure sensors
11 reduction gearing
12 travel unit
15 clutch
16 solenoid proportional pressure-reducing valve
20 (rear-wheel side) hydraulic motor
20b tilting amount control means
20c rotation sensor
21 reduction gearing
22 travel unit
30 HST speed change unit
31 controller

BEST MODE FOR CARRYING OUT THE INVENTION

Embodiments of the present invention will be described below with reference to the drawings.

FIG. 1 is a hydraulic construction diagram of an HST travel system for a working machine according to a first embodiment of the present invention.

In FIG. 1, the HST travel system for the working machine according to the present invention comprises an HST speed change unit 30 and travel units 12, 22.

The HST speed change unit 30 comprises a main hydraulic pump 1 driven by an engine 2, and two hydraulic motors 10, 20 for traveling which are driven by a hydraulic fluid delivered from the hydraulic pump 1 and have the same displacement. The hydraulic pump 1 and the hydraulic motor 10 are connected to each other in a closed circuit through main lines 3, 4, 5 and 6. The hydraulic pump 1 and the hydraulic motor 20 are connected to each other in a closed circuit through main lines 3, 4, 7 and 8. The two hydraulic motors 10, 20 are connected in parallel with respect to the hydraulic pump 1.

The hydraulic motors 10, 20 for traveling are coupled respectively to the travel units 12, 22. The travel unit 12 comprises a reduction gearing 11 to which is coupled the travel hydraulic motor 10, an axle 13, and front wheels (also simply called wheels) 14, the latter twos being coupled to the reduction gearing 11. The travel unit 22 comprises a reduction gearing 21 to which is coupled the travel hydraulic motor 20, an axle 23, and rear wheels (also simply called wheels)) 24, the latter twos being coupled to the reduction gearing 21. Driving forces are transmitted from the respective wheels 14, 24 to the road surface so that a vehicle body is driven by both the driving forces. A clutch 15 for selectively transmitting and cutting torque is disposed between the hydraulic motor 10 and the travel unit 12 on the front wheel side. The clutch 15 is operated by a pilot pressure supplied from a solenoid proportional pressure-reducing valve 16. A speed reduction ratio of each of the reduction gearings 11, 21 is decided depending on the travel performance characteristics demanded for the vehicle. For example, the speed reduction ratios are set equal to each other, or the speed reduction ratio of the front-wheel side reduction gearing 11 provided with the clutch 15 is set relatively larger. In this embodiment, the speed reduction ratio of the front-wheel side reduction gearing 11 is set larger than that of the rear-wheel side reduction gearing 21.

The hydraulic pump 1 and the travel hydraulic motors 10, 20 are each of the variable displacement type and are provided respectively with tilting amount control means (tilting regulators) 1b, 10b and 20b for controlling their tilting amounts. Of the hydraulic motors 10, 20, at least the front-wheel side hydraulic motor 10 provided with the clutch 15 can be controlled to a state of zero tilting. A rotation sensor 20c for detecting the rotation speed of the hydraulic motor 20 is disposed in association with the rear-wheel side hydraulic motor 20 on which is provided no clutch, and a detected signal from the rotation sensor 20c is inputted to a controller 31. The controller 31 computes a machine traveling speed (vehicle speed) based on the detected signal from the rotation sensor 20c, and executes predetermined arithmetic and logical operations based on the computed traveling speed, to thereby control the tilting amount control means 10b, 20b for the hydraulic motors 10, 20.

The construction and control circuit of the tilting amount control means 1b for the hydraulic pump 1 are the same as those of the known tilting amount control means. Briefly speaking, the tilting amount control means 1b comprises a tilting cylinder and a forward/backward changeover valve. The forward/backward changeover valve is operatively linked with a forward/backward changeover lever (not shown). When the forward/backward changeover lever is in a neutral (stop) position, the forward/backward changeover valve is also in a neutral position where the tilting cylinder is controlled so that the hydraulic pump 1 is brought into the state of zero tilting and the delivery rate of the hydraulic pump 1 is held zero. When the forward/backward changeover lever is shifted to a forward position or a backward position, the forward/backward changeover valve is also shifted correspondingly. Thus, the operating direction of the tilting cylinder is controlled and the tilting direction of the hydraulic pump 1 is also controlled. Further, the tilting amount control mean 1b for the hydraulic pump 1 includes a control pressure generation circuit, and a control pressure generated by the control pressure generation circuit is supplied to the tilting cylinder through the forward/backward changeover valve for control of the tilting amount of the hydraulic pump 1. The control pressure generation circuit is operated to raise the control pressure in proportion to an increase in the revolution speed of the engine 2, thereby increasing the tilting amount (displacement) of the hydraulic pump 1. Thus, with the increase in the revolution speed of the engine 2, the rotation speed and the tilting amount of the hydraulic pump 1 are both increased. Consequently, the delivery rate of the hydraulic pump is smoothly increased in accordance with the increase in the revolution speed of the engine 1 in a quick response manner so that the vehicle can travel under smooth and powerful acceleration. The revolution speed of the engine 2 is adjusted in accordance with operation of an accelerator pedal (not shown).

Figure 2:
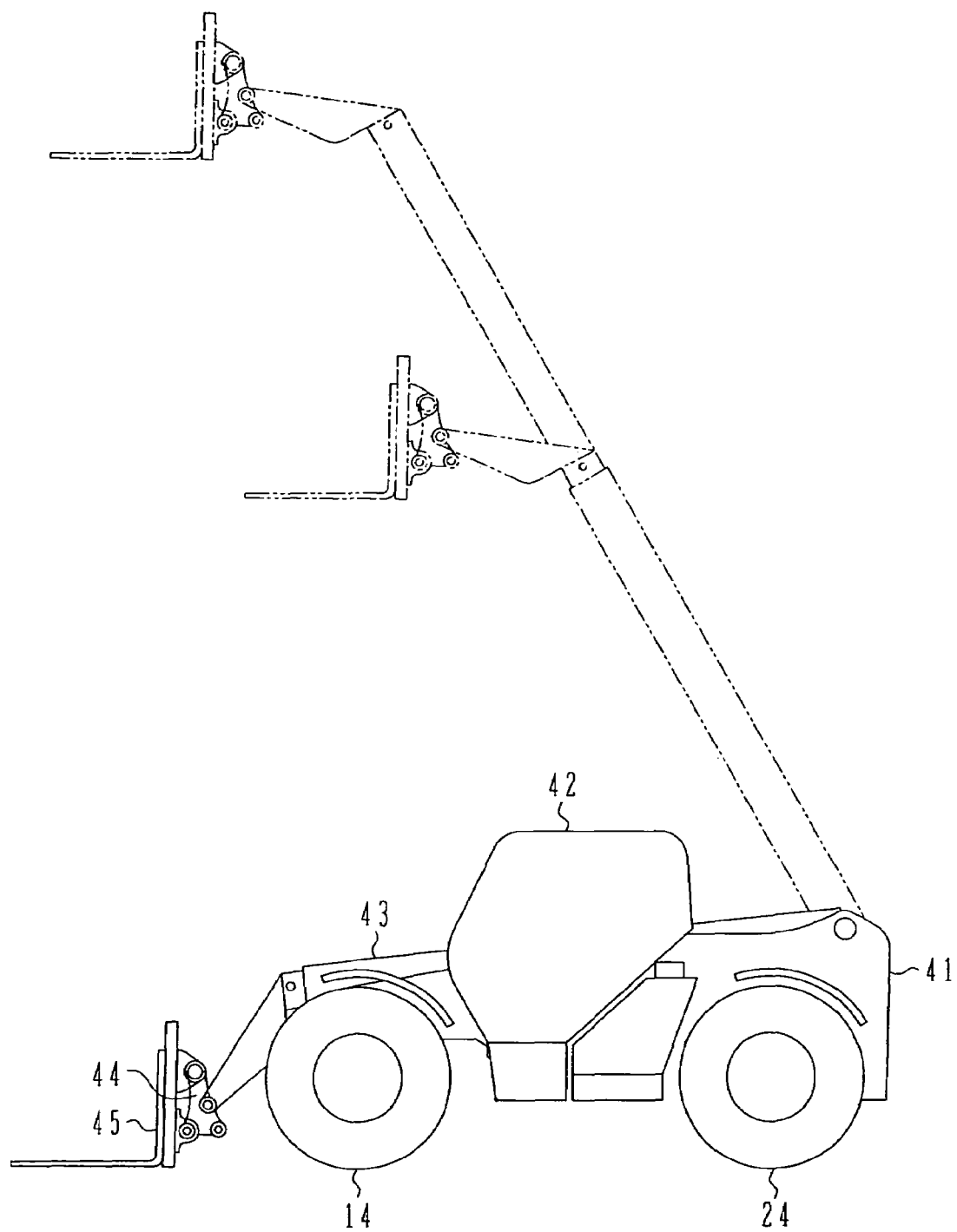
FIG. 2 is a schematic view showing an external appearance of a rough-terrain lift truck (also called a telescopic handler) as one example of a working machine in which is installed the HST travel system according to the present invention.

FIG. 2 is a schematic view showing an external appearance of a rough-terrain lift truck (also called a telescopic handler) as one example of a working machine in which is installed the HST travel system according to the first embodiment.

In FIG. 2, the rough-terrain lift truck comprises a truck body 41, a cab 42 located on the truck body 41, a telescopically extendable boom 43 mounted to the truck body 41 in a manner capable of angularly moving up and down along a side of the cab 42, an attachment mount portion 44 rotatably mounted to a fore end of the boom 43, and a fork 45 which is one kind of attachment used in loading work and is mounted to the attachment mount portion 44. The boom 43, the attachment mount portion 44, and the fork 45 constitute an operating mechanism. Further, though not shown in FIG. 2, respective hydraulic actuators are mounted to the boom 43, the attachment mount portion 44, and the fork 45 so that each operating member can be driven by the corresponding hydraulic actuator.

Imaginary lines in FIG. 2 indicate two states, i.e., a state where the boom 43 is raised and a state where the boom 43 is raised and extended. As shown, even in the state of the boom 43 being raised, the posture of the fork 45 is not changed by the link action of the attachment mount portion 44.

Front wheels 14 and rear wheels 24 are mounted to the truck body 41.

A manner of controlling the tilting amounts of the hydraulic motors 10, 20 (i.e., the motor displacements) and the ON/OFF-state of the clutch 15 by the controller 13 will be described below.

Figure 3:
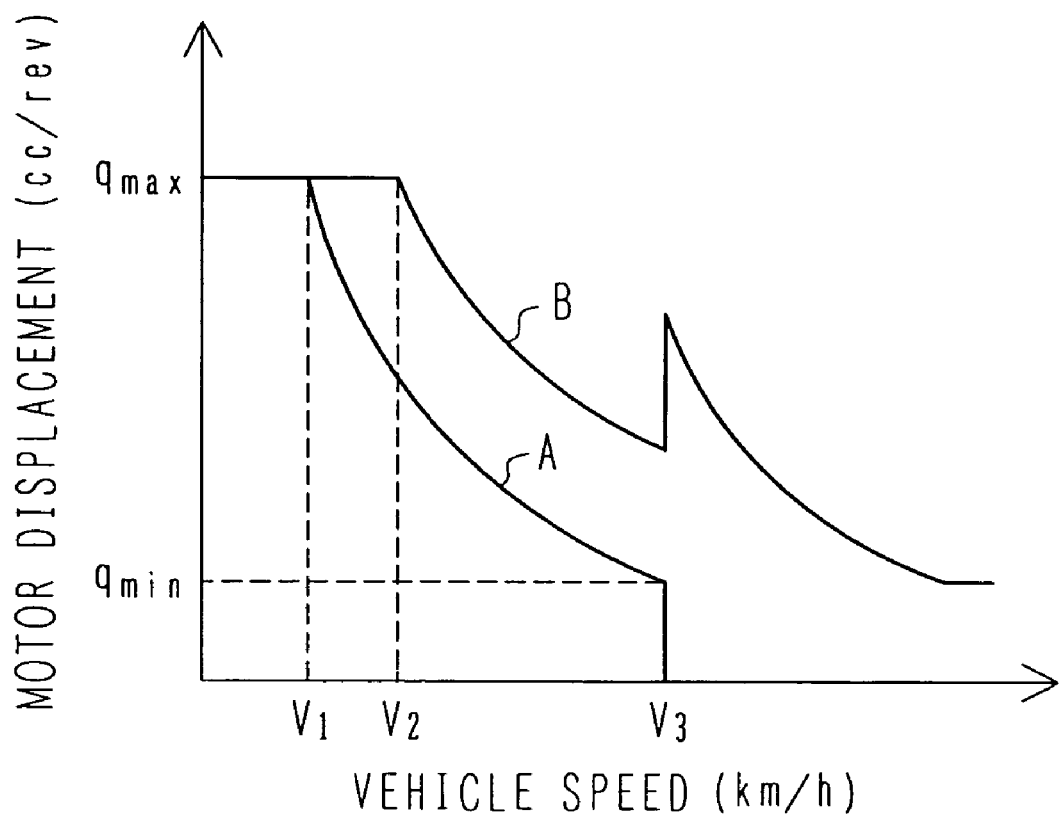
FIG. 3 is a graph showing one example of tilting control characteristics of hydraulic motors.

FIG. 3 is a graph showing one example of tilting control characteristics (hereinafter referred to simply as "control characteristics") of the hydraulic motors 10, 20. In FIG. 3, the horizontal axis represents the truck traveling speed, and the vertical axis represents the tilting amount of each of the hydraulic motors 10, 20 (motor displacement). Also, a letter A represents the control characteristic of the front-wheel side hydraulic motor 10, and a letter B represents the control characteristic of the rear-wheel side hydraulic motor 20. Roughly speaking, the control characteristics A, B of the hydraulic motors 10, 20 are set such that the tilting amounts of the hydraulic motors 10, 20 are reduced as the speed increases. Further, because the hydraulic motor 10 coupled to the reduction gearing 11 having the higher speed reduction ratio is rotated at a higher speed and consumes the hydraulic fluid at a larger flow rate than the hydraulic motor 20, the tilting amount of the hydraulic motor 10 starts to reduce before the tilting amount of the hydraulic motor 20 starts to reduce. Stated another way, assuming that the speeds at which the tilting amounts of the hydraulic motors 10, 20 start to reduce are respectively V1, V2, V1<V2 is held. In addition, the tilting control range of the hydraulic motor 10 is from the speed V1 to V3, and the tilting amount of the hydraulic motor 10 is shifted from a minimum value qmin to zero tilting (zero displacement) at the speed V3. Correspondingly, the drive mode is switched over from low-speed four-wheel drive in which the travel units 12, 22 (i.e., the front wheels 14 and the rear wheels 24) are both driven, to high-speed two-wheel drive in which the tilting amount of the hydraulic motor 10 is set to the zero tilting (zero displacement) and only the rear-wheel side travel unit 22 (i.e., the rear wheels 24) is driven.

At the same time when the tilting amount of the hydraulic motor 10 is shifted from the minimum value qmin to the zero tilting, the tilting amount of the hydraulic motor 20 is controlled so as to increase. The reason is that, since the excessive flow rate of the hydraulic fluid generated upon the shift of the hydraulic motor 10 to the zero tilting may generate a shock, the hydraulic motor 20 is required to be controlled so as to absorb the excessive flow rate.

A tilting increase Δq of the hydraulic motor 20 at that time is expressed by:

$$\Delta q = (i1/i2)q\text{min} \quad (1)$$

i1: speed reduction ratio of the hydraulic motors 10 i2: speed reduction ratio of the hydraulic motors 20 (herein $i2 \leq i1$)

qmin: minimum value in the tilting control range of the hydraulic motor 10

In other words, the delivery rate of the other hydraulic motor 20 is increased in amount corresponding to a decrease in the delivery rate of the hydraulic motor 10, which is caused when the tilting amount of the one hydraulic motor 10 is shifted from the minimum value qmin to the zero tilting. As a result, the tilting amount q of the hydraulic motor 10 after the shift is expressed below on assumption that the tilting amount of the hydraulic motor 20 before the shift is q0:

$$q = q0 + \Delta q = q0 + (i1/i2)q\text{min} \quad (2)$$

Thus, the tilting amount after the shift is given by adding, to the value q0 before the shift, a value obtained from the speed reduction ratios i1, i2 and the minimum value qmin in the tilting control range of the hydraulic motor 10.

Conversely, when the truck traveling speed is reduced, the tilting amount q of the hydraulic motor 20 after the shift is expressed below in order to supply the hydraulic fluid at a flow rate required for starting the hydraulic motor 10 again on assumption that the tilting amount of the hydraulic motor 20 before the shift is q0:

$$q = q0 - \Delta q = q0 - (i1/i2)q\min \quad (3)$$

By controlling the tilting amounts of the hydraulic motors 10, 20 as described above, it is possible to suppress an abrupt change in the flow rate of the hydraulic fluid within the hydraulic circuit during the operation, to avoid a variation of the circuit pressure, e.g., a surge pressure, and to reduce a shock.

The clutch 15 is operated as follows. In acceleration, the clutch is turned off (cut) to disconnect the hydraulic motor 10 and the travel unit 11 from each other after the hydraulic motor 10 has been brought into the zero tilting. In deceleration, the clutch is turned on to connect the hydraulic motor 10 and the travel unit 11 with each other before the hydraulic motor 10 is shifted into the tilting control range from the zero tilting.

The controller 31 stores, in its internal memory, the control characteristics shown in FIG. 3. By referring to the control characteristics shown in FIG. 3 with respect to, as a parameter, the truck traveling speed (vehicle speed) obtained based on the detected signal from the rotation sensor 20c, the controller 31 computes respective target tilting amounts of the hydraulic motors 10, 20 and controls the tilting amount control means 10b, 20b for the hydraulic motors 10, 20 and the clutch 15.

Figure 4:
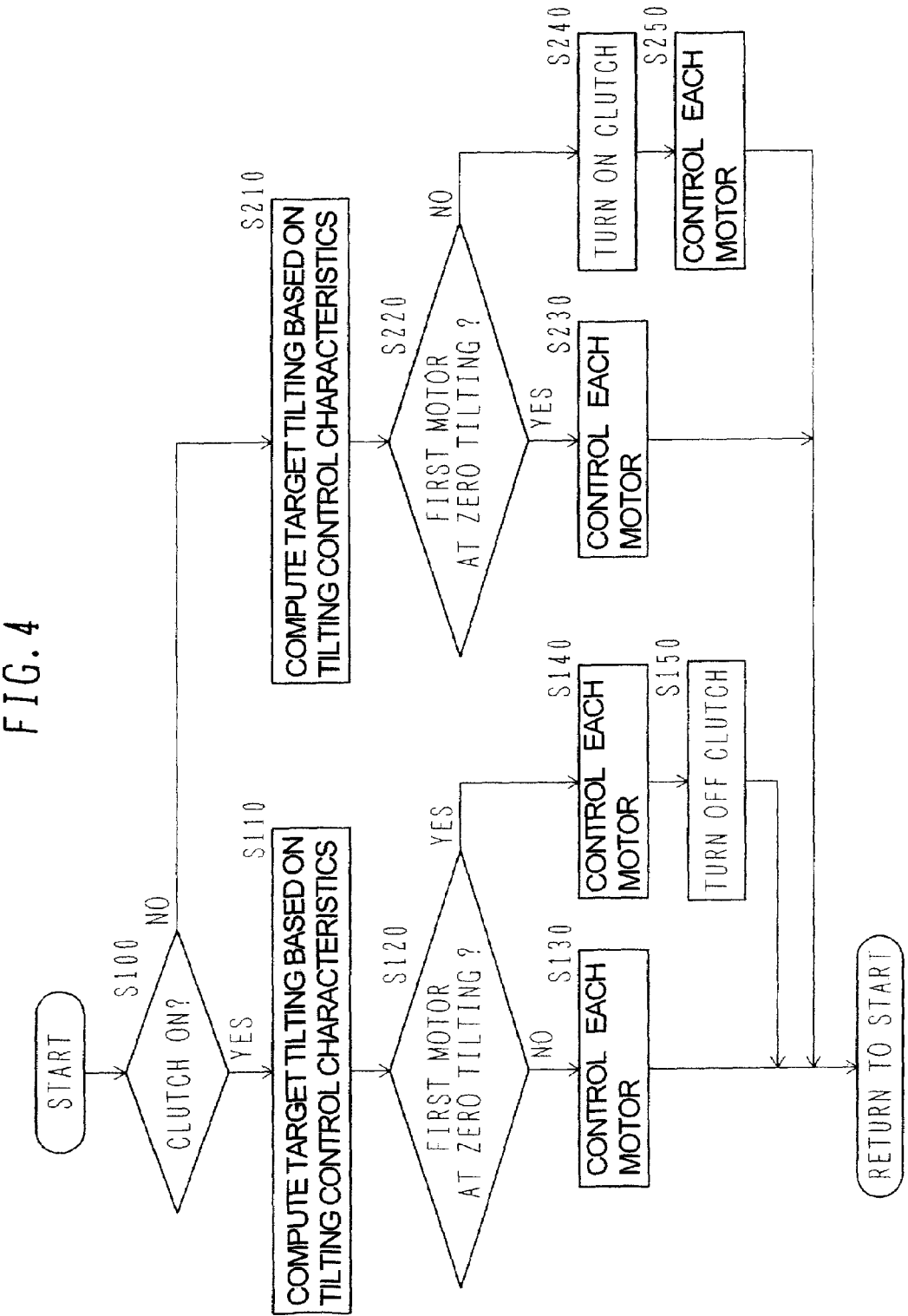
FIG. 4 is a flowchart showing processing steps executed by a controller.

FIG. 4 is a flowchart showing processing steps executed by the controller 31.

Referring to FIG. 4, the controller 31 determines in step S100 whether the clutch 15 is turned on. If the clutch 15 is turned on, the controller 31 shifts to the low-speed four-wheel drive mode in steps S110-S150, and if the clutch 15 is turned off, it shifts to the high-speed two-wheel drive mode in steps S210-S250. In the low-speed four-wheel drive mode, the controller 31 executes control in steps S110, S120 and S130 such that the displacements of the hydraulic motors 10, 20 are reduced as the truck traveling speed increases, and that the displacements of the hydraulic motors 10, 20 are increased as the traveling speed reduces. In the high-speed two-wheel drive mode, the controller 31 executes control in steps S210, S220 and S230 such that the front-wheel side hydraulic motor 10 is brought to the zero displacement, and that the displacement of the hydraulic motor 20 is reduced as the truck traveling speed increases, and the displacement of the hydraulic motor 20 is increased as the traveling speed reduces.

The clutch 15 is switched over from the ON-state to the OFF-state in step S150 when the hydraulic motor 10 has been shifted to the zero tilting. The zero tilting of the hydraulic motor 10 is established by setting the target tilting amount to zero in step S110 when the traveling speed has reached V3, and by determining in step S120 whether the target tilting amount is zero. Also, the clutch 15 is switched over from the OFF-state to the ON-state in step S240 when the hydraulic motor 10 has been returned to the minimum tilting qmin from the zero tilting. The return of the hydraulic motor 10 to the minimum tilting qmin is established by setting the target tilting amount to the minimum qmin in step S210 when the traveling speed has reached V3, and by determining in step S220 whether the target tilting amount is the minimum qmin.

Thus, the controller 31 constitutes control means for selectively switching over the low-speed four-wheel drive mode in which the travel units 12, 22 are both driven and the high-speed two-wheel drive mode in which the front-wheel side hydraulic motor 10 is brought to the zero tilting and only the rear-wheel side travel unit 22 is driven. Also, the controller 31 and the rotation sensor 20c constitute control means for detecting the truck traveling speed and selectively switching over the drive mode so as to set, when the traveling speed is not higher than the setting value V3, the low-speed four-wheel drive mode in which the travel units 12, 22 are both driven, and to set, when the traveling speed exceeds the setting value V3, the high-speed two-wheel drive mode in which only the rear-wheel side travel unit 22 is driven.

The operation of this first embodiment will be described below with reference to the flowchart of FIG. 4.

At startup, the forward/backward changeover lever (not shown) is shifted from the neutral (stop) position to the forward position and the accelerator pedal (not shown) is pushed down to increase the revolution speed of the engine 2. As described above, when the revolution speed of the engine 2 is increased, the delivery rate of the hydraulic pump 1 is increased and the rotation speeds of the hydraulic motors 10, 20 are increased with the increase of the pump delivery rate, thus causing the vehicle body to start to travel. The tilting amounts of the hydraulic motors 10, 20 at the startup of travel are each at a maximum qmax. As the engine revolution speed is increased to increase the rotation speeds of the hydraulic motors 10, 20, the traveling speed is also increased correspondingly.

<In Acceleration>

In acceleration, the controller 31 executes control through steps of computing the target tilting amounts such that, as the vehicle speed increases, the respective tilting amounts of the hydraulic motors 10, 20 are reduced in accordance with the control characteristics shown in FIG. 3, and of outputting commands corresponding to the respective target tilting amounts to the tilting amount control means 10b, 20b, thereby controlling the tilting amounts of the hydraulic motors 10, 20 to the corresponding target amounts (i.e., step S100→S110→S120→S130). When the vehicle speed is increased to the preset speed V3, the target tilting amount of the hydraulic motor 10 is shifted from the minimum value qmin to the zero, and the target tilting of the hydraulic motor 20 is computed based on the above-mentioned formula (2) so as to be able to absorb the excessive flow rate of the hydraulic fluid generated when the hydraulic motor 10 is brought to the zero tilting. Commands corresponding to the respective target tilting amounts are outputted to the tilting amount control means 10b, 20b, thereby controlling the tilting amounts of the hydraulic motors 10, 20 (i.e., step S100→S110→S120→S140). As a result, the hydraulic motor 10 is brought to the zero tilting, and at the same time the tilting amount of the hydraulic motor 20 is modified and controlled to be able to absorb the excessive flow rate of the hydraulic fluid generated when the hydraulic motor 10 is brought to the zero tilting.

After executing the control to bring the hydraulic motor 10 to the zero tilting, the controller 31 outputs, to the solenoid proportional pressure-reducing valve 16, a command for turning off the clutch 15, thereby cutting the interconnection between the travel unit 12 and the hydraulic motor 10 (step S150). After the turning-off of the clutch, in accordance with the control characteristics shown in FIG. 3, the controller 31 sets the target tilting amount of the hydraulic motor 10 so that the hydraulic motor 10 is held at the zero tilting, and computes the target tilting amount of the hydraulic motor 20 such that the tilting amount of the hydraulic motor 20 is reduced as the vehicle speed increases, followed by outputting commands corresponding to the respective target tilting amounts to the tilting amount control means 10b, 20b, to thereby control the tilting amounts of the hydraulic motors 10, 20 (i.e., step S100→S210→S220→S230).

<In Deceleration>

In deceleration, in accordance with the control characteristics shown in FIG. 3, the controller 31 computes the target tilting amount of the hydraulic motor 20 such that the tilting amount of the hydraulic motor 20 is increased as the vehicle speed reduces, and also sets the target tilting amount of the hydraulic motor 10 so that the hydraulic motor 10 is held at the zero tilting, followed by outputting commands corresponding to the respective target tilting amounts to the tilting amount control means 10b, 20b, to thereby control the tilting amounts of the hydraulic motors 10, 20 to the corresponding target amounts (i.e., step S100→S210→S220→S230). When the vehicle speed is reduced to the preset speed V3, the target tilting amount of the hydraulic motor 10 is returned to the minimum value qmin from the zero tilting, and the target tilting amount of the hydraulic motor 20 is computed based on the above-mentioned formula (3) so as to be able to supply the hydraulic fluid at a flow rate required when the hydraulic motor 10 is returned from the zero tilting (step S210). Further, a command for turning on the clutch 15 is outputted to establish the interconnection between the travel unit 12 and the hydraulic motor 10 (step S240). Thereafter, commands corresponding to the respective target tilting amounts are outputted to the tilting amount control means 10b, 20b, thereby controlling the tilting amounts of the hydraulic motors 10, 20 (i.e., step S250). As a result, the hydraulic motor 10 is returned from the zero tilting, and at the same time the tilting amount of the hydraulic motor 20 is modified and controlled to be able to supply the hydraulic fluid at the flow rate required when the hydraulic motor 10 is returned from the zero tilting. Subsequently, in accordance with the control characteristics shown in FIG. 3, the controller 31 computes the target tilting amounts of the hydraulic motors 10, 20 such that the tilting amounts of the hydraulic motors 10, 20 are increased as the vehicle speed reduces, followed by outputting commands corresponding to the respective target tilting amounts to the tilting amount control means 10b, 20b, to thereby control the tilting amounts of the hydraulic motors 10, 20 (i.e., step S100→S110→S120→S130).

Thus, in acceleration, the tilting amount of the hydraulic motor 20 is modified and controlled to be able to absorb the excessive flow rate of the hydraulic fluid generated when the hydraulic motor 10 is brought to the zero tilting. In deceleration, the tilting amount of the hydraulic motor 20 is modified and controlled to be able to supply the hydraulic fluid at the flow rate required when the hydraulic motor 10 is returned from the zero tilting. It is therefore possible to achieve the intended objects, such as control of the driving torque and reduction of energy loss, and to reduce a shock caused when the driving torque control is performed.

This first embodiment constituted as described above can provide the following advantages.

1) Since the front-wheel side travel unit 12 and the rear-wheel side travel unit 22 are driven by the separate hydraulic motors 10, 20, the propeller shaft is no longer required. Also, since the drive mode is switched over between the low-speed four-wheel drive mode and the high-speed two-wheel drive mode, the truck can travel over a range from low speed to high speed with no need of the transmission. Therefore, the positions for installation of the cab and the engine are not restricted by the presence of the transmission and the propeller shaft, whereby the cab can be installed at a position lower than that in the known working machine (rough terrain truck) including the transmission and the propeller shaft. As a result, viewability from the cab toward the operating mechanism is improved and operability is increased.

2) The clutch 15 is disposed between the hydraulic motor 10 and the travel unit 12 on the front-wheel side, and in the high-speed two-wheel drive mode, the clutch 15 is turned off to cut the interconnection between the hydraulic motor 10 and the travel unit 12. Therefore, the load imposed on the travel unit 12 with the motor rotation is reduced and energy loss is also reduced.

3) The operations for stopping and starting the hydraulic motor 10 for the switching-over between the low-speed four-wheel drive mode and the high-speed two-wheel drive mode are performed, without using the open/close valve as in the prior art, based on the tilting control of the hydraulic motor 10 (i.e., the control of shifting the tilting amount of the hydraulic motor 10 from the minimum value qmin to the zero tilting when the hydraulic motor 10 is stopped, and the control of returning the tilting amount of the hydraulic motor 10 from the zero tilting to the minimum value qmin when the hydraulic motor 10 is started). Therefore, the circuit arrangement of the HST speed change unit 30 can be simplified.

4) When the traveling speed reaches the setting value V3, the drive mode is automatically switched over from the low-speed four-wheel drive to the high-speed two-wheel drive, or vice versa. Accordingly, operator's manual operation for switching over the drive mode is no longer required and superior operability can be obtained.

5) Since the tilting of the hydraulic motor 20 is controlled at the same time as when the hydraulic motor 10 is shifted to the zero tilting, it is possible to suppress an abrupt change in the flow rate of the hydraulic fluid (e.g., generation of the excessive flow rate) caused in the hydraulic circuit of the HST speed change unit 30 with the switching-over between the low-speed four-wheel drive and the high-speed two-wheel drive. Accordingly, a variation in circuit pressure, e.g., a surge pressure, can be avoided and a shock can be held down.

Figure 5:
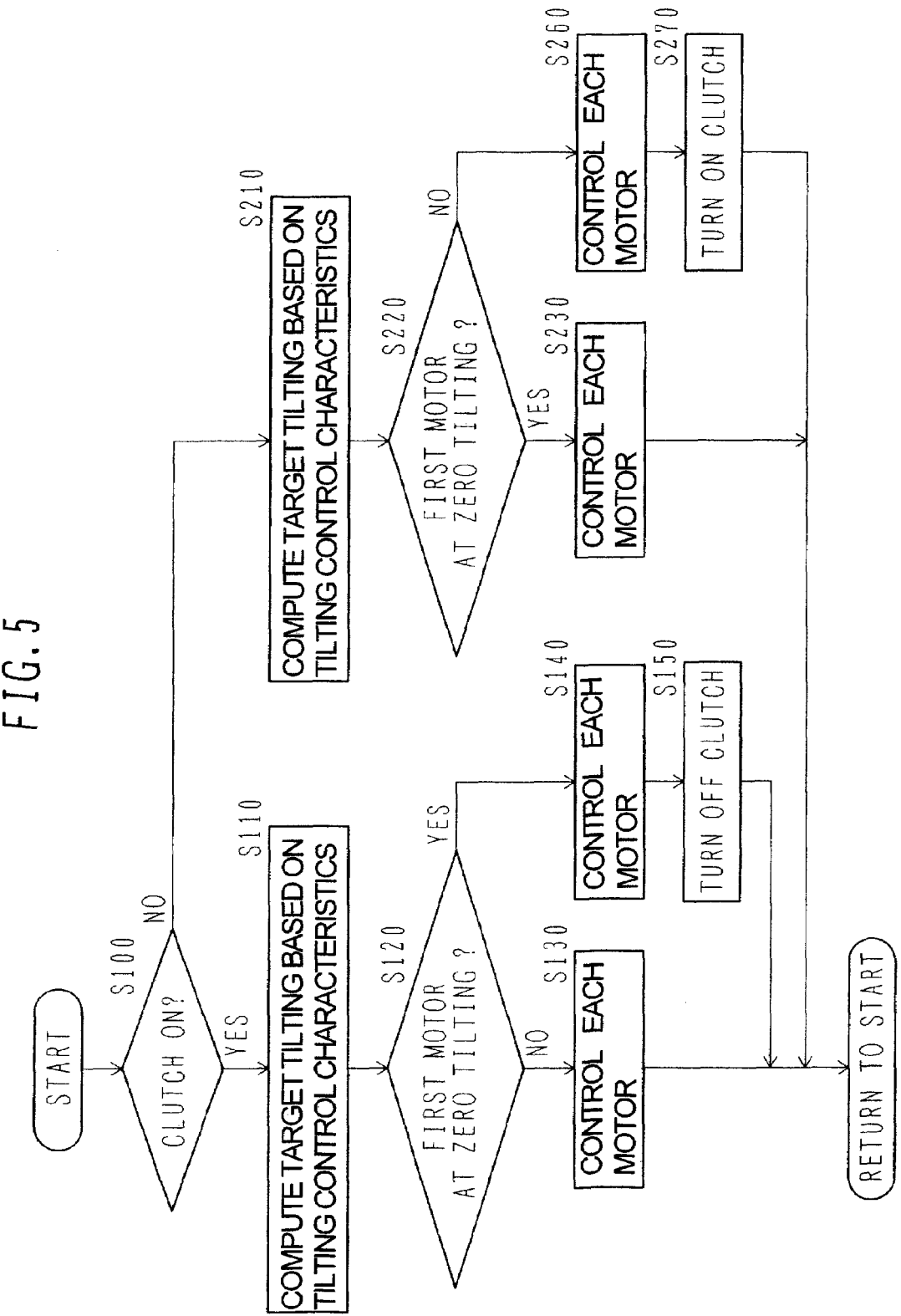
FIG. 5 is a flowchart showing processing steps executed by a controller in a second embodiment of the present invention.

A second embodiment of the present invention will be described below with reference to FIG. 5. Note that, in FIG. 5, identical steps to those shown in FIG. 4 are denoted by the same numerals.

In the first embodiment, the operations of turning on and off the clutch 15 are both performed when the hydraulic motor 10 is at the zero tilting. The torque transmitted by the hydraulic motor 10 at that time (i.e., the torque hydraulically absorbed by the hydraulic motor 10 at the timing of the clutch being turned on and off) is zero. However, if the inertia of the hydraulic motor 10 is not ignorable, driving torque due to an inertial force is generated. More specifically, when the connection of the hydraulic motor 10 to the travel unit 12 in deceleration is established by turning on the clutch before the hydraulic motor 10 is shifted into the control range from the zero tilting, the hydraulic motor 10 is abruptly connected from the stopped state to the travel unit 12 under rotation, and the inertial force of the hydraulic motor 10 acts on the travel unit 12 in such a direction as holding the hydraulic motor 10 in the stopped state. As a result, the travel unit 12 suffers from a shock acting in the direction of stopping the travel unit 12.

The second amendment is designed in a consideration of the above-described point, and FIG. 45 is a flowchart showing processing steps executed in the second embodiment.

The connection of the hydraulic motor 10 to the travel unit 12 in deceleration is performed by turning on the clutch after the hydraulic motor 10 has been shifted into the control range from the zero tilting (i.e., S100→S210→S260→S270). With such control, the rotation of the hydraulic motor 10 is sped up to a level near the rotation speed of the travel unit 12 (i.e., the rotation speed of the clutch 15) while the clutch is held in the OFF-state. When the clutch is turned on subsequently for the interconnection between the hydraulic motor 10 and the travel unit 12, the difference between the rotation of the hydraulic motor 10 and the rotation speed of the travel unit 12 is small. Therefore, the inertial force from the hydraulic motor 10 is reduced and the resulting shock can be suppressed.

A third embodiment of the present invention will be described below with reference to FIGS. 6 and 7. Note that identical components in FIG. 6 to those shown in FIG. 1 are denoted by the same numerals and identical steps in FIG. 7 to those shown in FIGS. 4 and 5 are denoted by the same numerals.

In the above-described second embodiment, the rotation speed of the hydraulic motor 10 is controlled to be matched with the rotation speed of the travel unit 12 on the driven side when the clutch 15 is shifted from the OFF-state to the ON-state. However, because the circuit pressure for driving the hydraulic motor 10, for example, differs depending on the travel load, etc., it is difficult to control the rotation speed of the hydraulic motor 10 to be accurately matched with the target rotation speed (i.e., the rotation speed of the travel unit 12).

Taking into account such a difficulty, the third embodiment is designed such that the rotation speed of the hydraulic motor 10 is controlled to be accurately matched with the target rotation speed. FIG. 6 is a hydraulic construction diagram according to the third embodiment, and FIG. 7 is a flowchart showing processing steps executed by a controller in the third embodiment.

Figure 6:
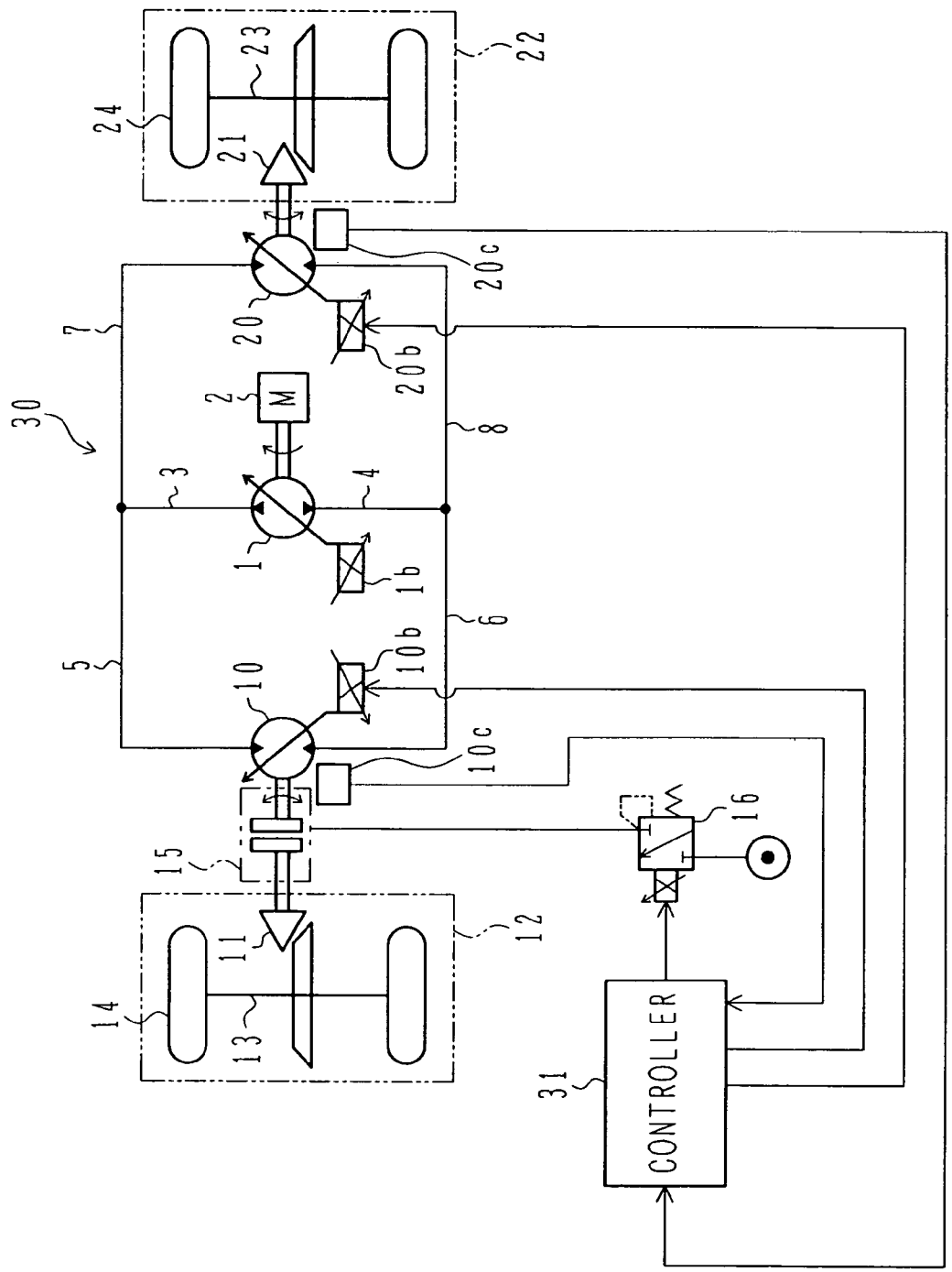
FIG. 6 is a hydraulic construction diagram of an HST travel system according to a third embodiment of the present invention.
Figure 7:
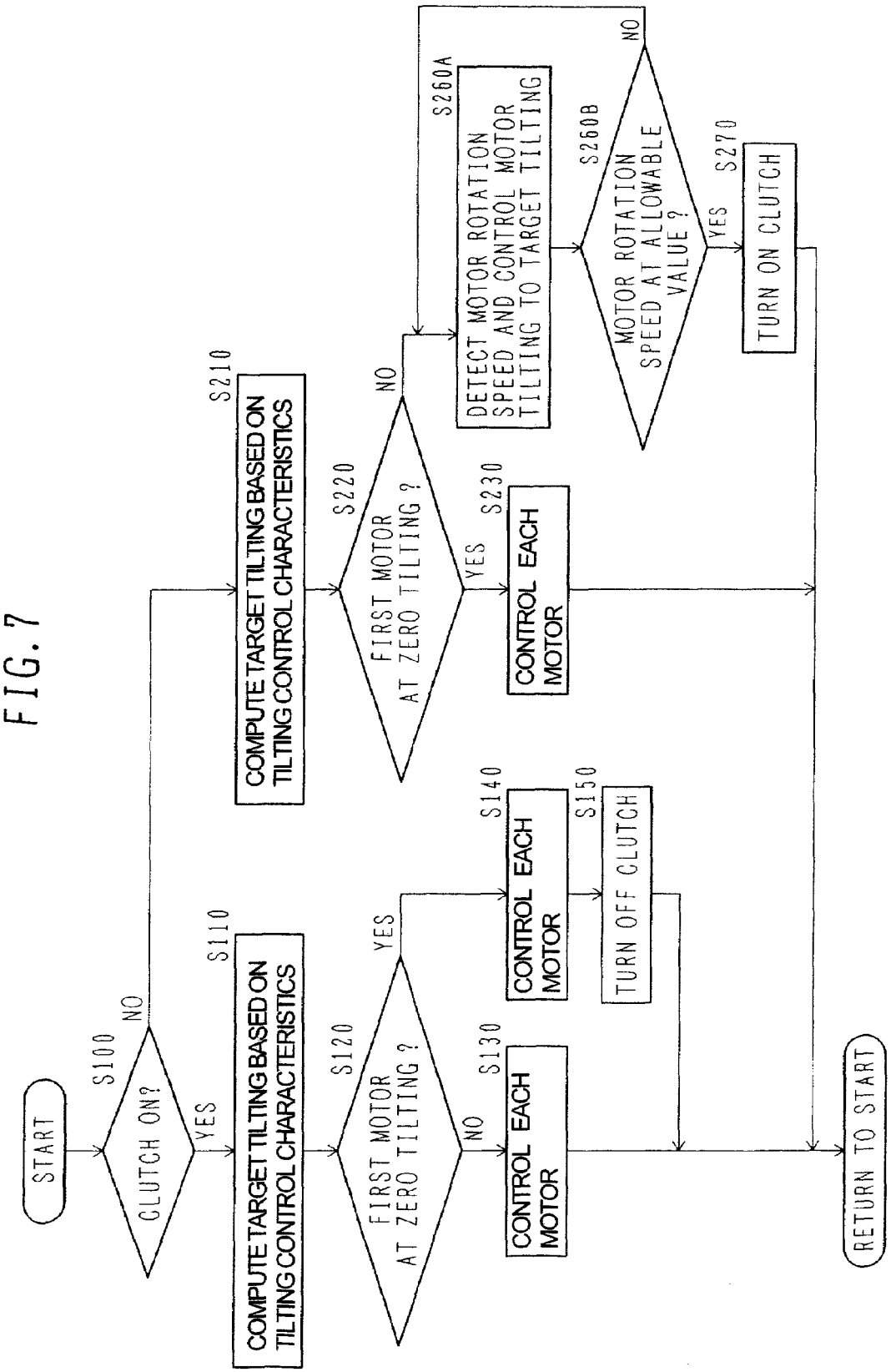
FIG. 7 is a flowchart showing processing steps executed by a controller.

Referring to FIG. 6, a rotation sensor 10c for detecting the rotation speed of the hydraulic motor 10 is disposed, and a rotation speed signal from the rotation sensor 10c is fed back to a controller 31 which executes control so that the rotation speed of the hydraulic motor 10 is matched with the target rotation speed.

When the target tilting amount of the hydraulic motor 10 is returned from the zero tilting with the clutch 15 held in the OFF-state, the rotation speed of the hydraulic motor 10 is detected and the tilting of the hydraulic motor 10 is controlled so that the rotation speed of the hydraulic motor 10 is matched with the target rotation speed (target value), and when the rotation speed of the hydraulic motor 10 reaches the target value or enters a predetermined target range, the clutch 15 is turned on (i.e., step S100→step S210→step S220→step S260A→step S260B→step S270). As a result, since the rotation speed of the hydraulic motor 10 is made almost matched with the rotation speed of the travel unit 12 on the driven side, the shock caused due to the difference in the rotation speed between both the sides upon the connection of the clutch can be further reduced.

A fourth embodiment of the present invention will be described below with reference to FIGS. 8 and 9. Note that identical components in FIG. 8 to those shown in FIGS. 1 and 6 are denoted by the same numerals and identical steps in FIG. 9 to those shown in FIGS. 4, 5 and 7 are denoted by the same numerals.

In the above-described third embodiment, if the circuit pressure in the HST speed change unit 30 is reversed (if the back pressure is higher) due to, e.g., abrupt deceleration when the rotation speed of the hydraulic motor 10 is controlled, the hydraulic motor 10 is rotated in the reversed direction even with the tilting applied to it, thus causing a trouble.

The fourth embodiment is designed with the view of avoiding such a trouble. FIG. 8 is a hydraulic construction diagram according to the fourth embodiment, and FIG. 9 is a flowchart showing processing steps executed by a controller in the third embodiment.

Figure 8:
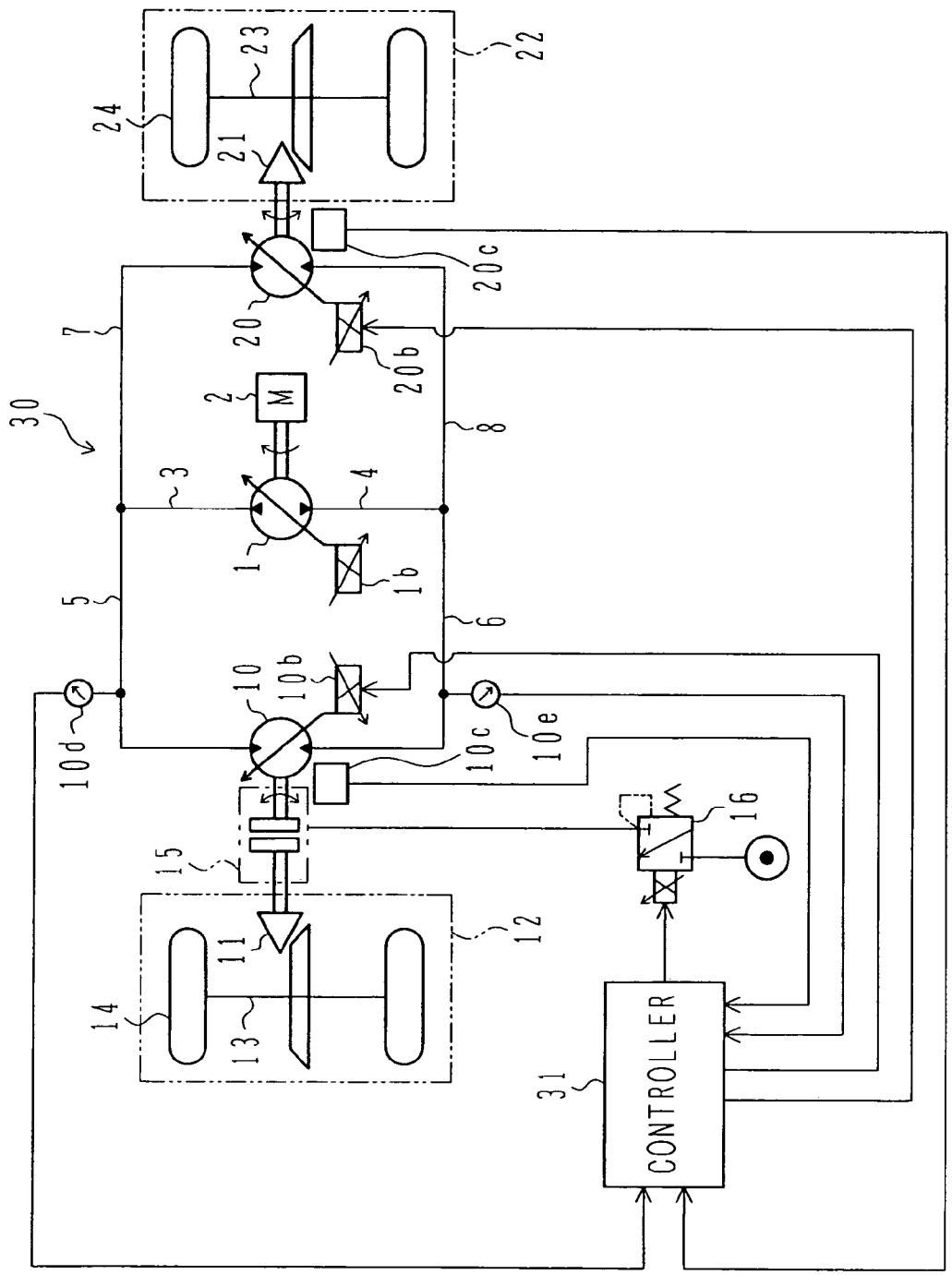
FIG. 8 is a hydraulic construction diagram of an HST travel system according to a fourth embodiment of the present invention.
Figure 9:
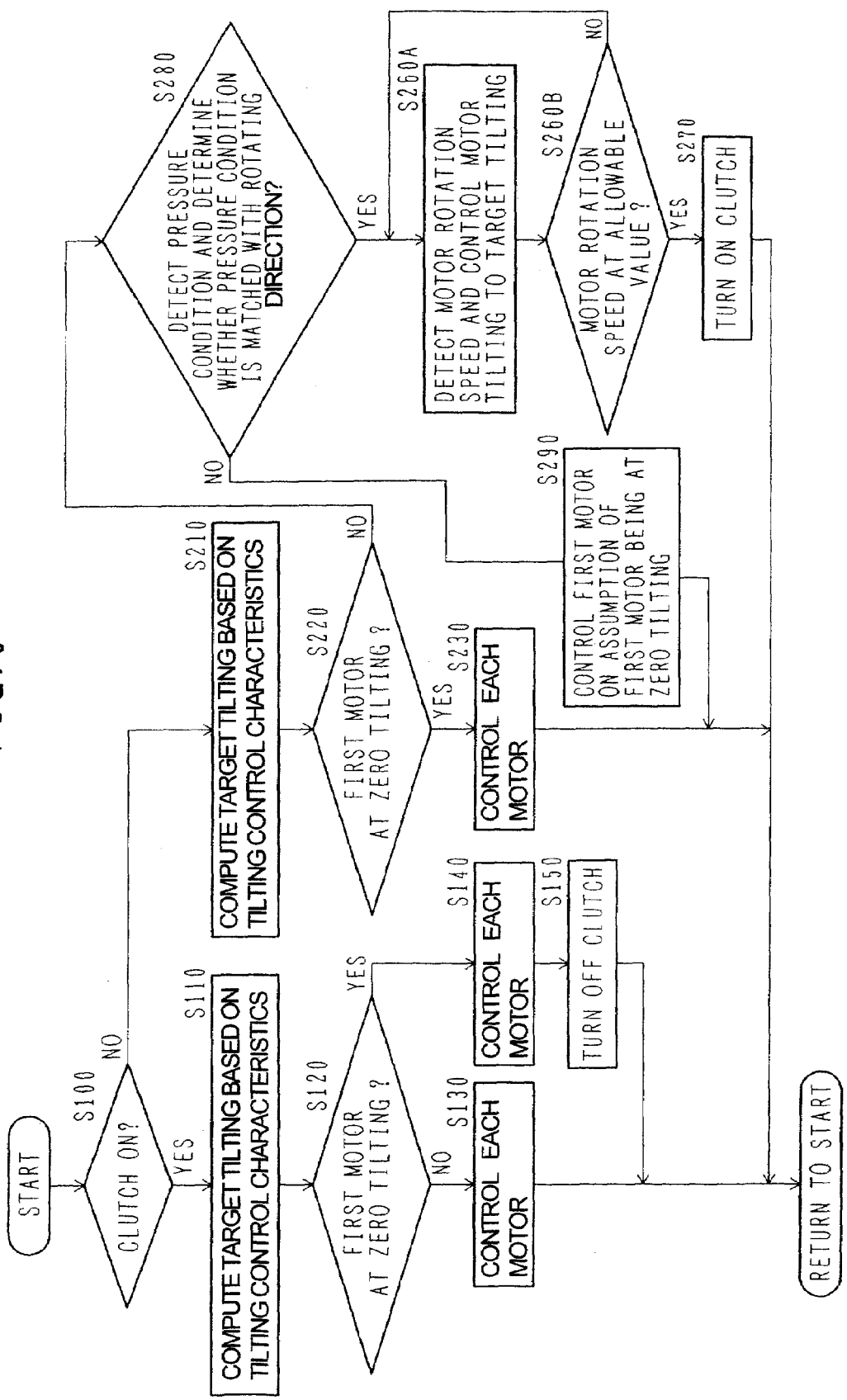
FIG. 9 is a flowchart showing processing steps executed by a controller.

Referring to FIG. 8, pressure sensors 10d, 10e for detecting respective circuit pressures at both ports of the hydraulic motor 10 are disposed, and pressure signals from the pressure sensors 10d, 10e are inputted to a controller 31.

When the target tilting amount of the hydraulic motor 10 is returned from the zero tilting with the clutch 15 held in the OFF-state, the circuit pressures at both the ports of the hydraulic motor 10 are detected to determine whether the pressure condition at that time is matched with the rotating direction of the hydraulic motor 10, and the rotation speed of the hydraulic motor 10 is controlled based on the determination (i.e., step S100→step S210→step S220→step S280→step S260A→step S260B→step S270). As a result, it is possible to reliably prevent the hydraulic motor 10 from coming into a situation where the hydraulic motor 10 is rotated in the reverse direction, and to ensure stable traveling.

While the first to fourth embodiments have been described above as executing the control to change the tilting amounts of the hydraulic motors 10, 20 depending on the traveling speed as shown in FIG. 3, the control for selectively switching-over the low-speed four-wheel drive and the high-speed two-wheel drive may be executed just by setting the front-wheel side hydraulic motor 10 to the zero tilting while the tilting amount control of those hydraulic motors is omitted (on condition that a hydraulic motor capable of being selectively switched over between large tilting and small tilting depending on the load pressure is used as in the known system). Such a modification can also provide the similar advantages. More specifically, neither the transmission nor the propeller shaft used in the known system is required any more, and the open/close valve used in the known system is also no longer required. Hence the circuit arrangement of the HST speed change unit 30 is simplified.

Also, while the embodiments have been described above as executing the tilting control of the hydraulic motor 20, as shown in FIG. 3, to absorb the excessive flow rate of the hydraulic fluid at the same time as when the hydraulic motor 10 is shifted to the zero tilting, that tilting control may be omitted if a level of the trouble, e.g., the surge pressure, is so small as not to cause a problem in practice. Particularly, in the third embodiment, the rotation speed of the hydraulic motor 10 is controlled to be almost matched with the rotation speed of the travel unit 12 on the driven side, and the shock caused due to the difference in the rotation speed between them upon the connection of the clutch can be substantially eliminated. Therefore, the control for absorbing the excessive flow rate may be omitted by executing only the rotation speed control.

Further, the zero-tilting control speed V3 is preferably shifted between when the clutch is turned off (i.e., at the timing of the shift from the low-speed side to high-speed side) and when the clutch is turned on (i.e., at the timing of the shift from the high-speed side to low-speed side), thus giving hysteresis to the zero-tilting control speed V3. The presence of the hysteresis contributes to preventing the occurrence of chattering during control, and to improving operability and system stability.

In addition, while the first to fourth embodiments have been described above as automatically switching over the drive mode from the low-speed four-wheel drive to the high-speed two-wheel drive, or vice versa when the traveling speed reaches the setting value V3, a selector switch for changing over the low speed and the high speed may be disposed such that the drive mode can be changed over by operator's manual operation of the selector switch.

The invention claimed is:

1. An HST travel system for a working machine, said HST travel system comprising:
   a hydraulic pump;
   one first hydraulic motor connected to said hydraulic pump in a closed circuit and driven by a hydraulic fluid delivered from said hydraulic pump;
   one second hydraulic motor connected to said hydraulic pump in a closed circuit in parallel with said first hydraulic motor and driven by the hydraulic fluid delivered from said hydraulic pump;
   a first travel unit connected to said first hydraulic motor through a first reduction gearing;
   a second travel unit connected to said second hydraulic motor through a second reduction gearing; and
   control means for selectively switching over a drive mode between low-speed four-wheel drive in which said first and second travel units are both driven and high-speed two-wheel drive in which said first hydraulic motor is controlled to zero displacement and only said second travel unit is driven,
   wherein when the drive mode is switched over from the low-speed four-wheel drive to the high-speed two-wheel drive, said control means controls a displacement of said second hydraulic motor to absorb an excessive flow rate of the hydraulic fluid, which is generated upon said first hydraulic motor being brought to the zero displacement from an effective displacement, at the same timing as when said first hydraulic motor is controlled to the zero displacement from the effective displacement, and when the drive mode is switched over from the high-speed two-wheel drive to the low-speed four-wheel drive, said control means controls the displacement of said second hydraulic motor to supply the hydraulic fluid at a flow rate, which is required by said first hydraulic motor upon said first hydraulic motor being brought to an effective displacement from the zero displacement, at the same timing as when said first hydraulic motor is controlled to the effective displacement from the zero displacement.

2. An HST travel system for a working machine, said HST travel system comprising:
   a hydraulic pump;
   one first hydraulic motor connected to said hydraulic pump in a closed circuit and driven by a hydraulic fluid delivered from said hydraulic pump;
   one second hydraulic motor connected to said hydraulic pump in a closed circuit in parallel with said first hydraulic motor and driven by the hydraulic fluid delivered from said hydraulic pump;
   a first travel unit connected to said first hydraulic motor through a clutch and a first reduction gearing;
   a second travel unit connected to said second hydraulic motor through a second reduction gearing; and
   control means for selectively switching over a drive mode between low-speed four-wheel drive in which said first and second travel units are both driven with said clutch brought into a connected state and high-speed two-wheel drive in which said first hydraulic motor is controlled to zero displacement with said clutch brought into a cutoff state and only said second travel unit is driven,
   wherein when the drive mode is switched over from the high-speed two-wheel drive to the low-speed four-wheel drive, said control means controls a displacement of said first hydraulic motor so as to shift from a zero displacement to a control range for preliminary driving of said first hydraulic motor before said clutch is brought into the connected state, and thereafter said control means controls said clutch to be brought into the connected state.

3. An HST travel system for a working machine, said HST travel system comprising:
   a hydraulic pump;
   first and second hydraulic motors connected to said hydraulic pump in a closed circuit, connected to each other in parallel, and driven by a hydraulic fluid delivered from said hydraulic pump;
   a first travel unit connected to said first hydraulic motor through a clutch and a first reduction gearing;
   a second travel unit connected to said second hydraulic motor through a second reduction gearing; and
   control means for selectively switching over a drive mode between low-speed four-wheel drive in which said first and second travel units are both driven with said clutch brought into a connected state and high-speed two-wheel drive in which said first hydraulic motor is controlled to zero displacement with said clutch brought into a cutoff state and only said second travel unit is driven,
   wherein when the drive mode is switched over from the high-speed two-wheel drive to the low-speed four-wheel drive, said control means computes a target rotation speed at which a rotation speed of said first hydraulic motor is matched with a rotation speed of said first travel unit, and controls a displacement of said first hydraulic motor to make the rotation speed of said first hydraulic motor matched with the target rotation speed for preliminary driving of said first hydraulic motor before said clutch is brought into the connected state, and thereafter said control means controls said clutch to be brought into the connected state.

4. The HST travel system for the working machine according to claim 3,
   wherein said control means detects respective pressures at both ports of said first hydraulic motor, and when both the ports of said first hydraulic motor are in pressure condition under which said first hydraulic motor cannot be operated for preliminary driving in a direction to realize said target rotation speed, said control means inhibits the displacement control for the preliminary driving of said first hydraulic motor.

5. The HST travel system for the working machine according to claim 2,
   wherein when the drive mode is switched over from the low-speed four-wheel drive to the high-speed two-wheel drive, said control means controls a displacement of said second hydraulic motor to absorb an excessive flow rate of the hydraulic fluid, which is generated upon said first hydraulic motor being brought to the zero displacement, at the same timing as when said first hydraulic motor is controlled to the zero displacement, and when the drive mode is switched over from the high-speed two-wheel drive to the low-speed four-wheel drive, said control means controls the displacement of said second hydraulic motor to supply the hydraulic fluid at a flow rate required by said first hydraulic motor, which starts to operate with an effective displacement, at the same timing as when said first hydraulic motor is controlled to the effective displacement from the zero displacement.

* * * * *